No. 881,832. PATENTED MAR. 10, 1908.
A. R. SPRAGUE.
APPARATUS FOR REFRIGERATION.
APPLICATION FILED AUG. 12, 1905.
2 SHEETS—SHEET 1.
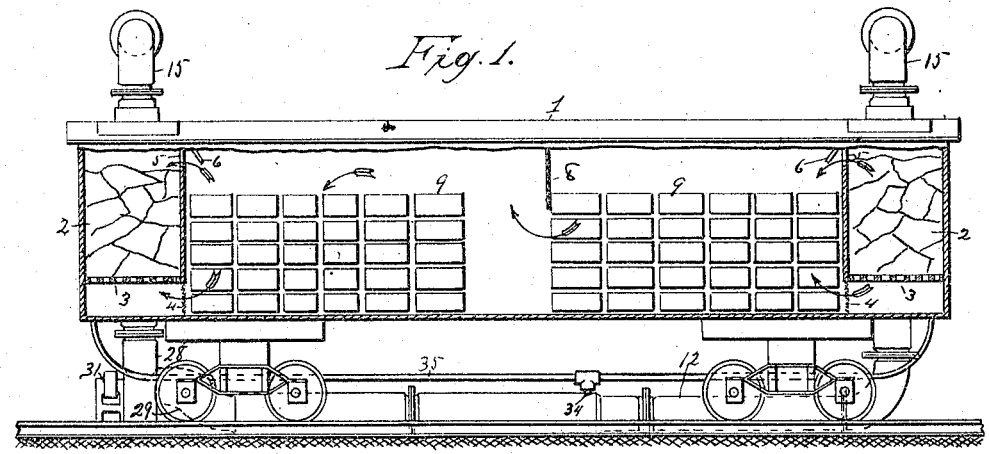
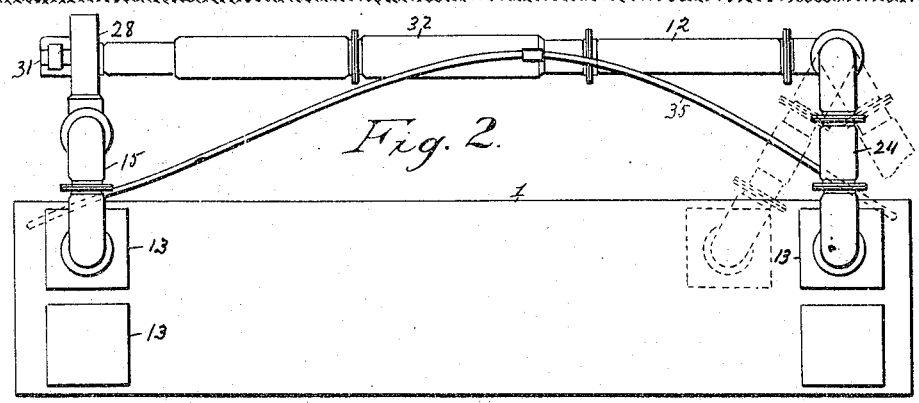
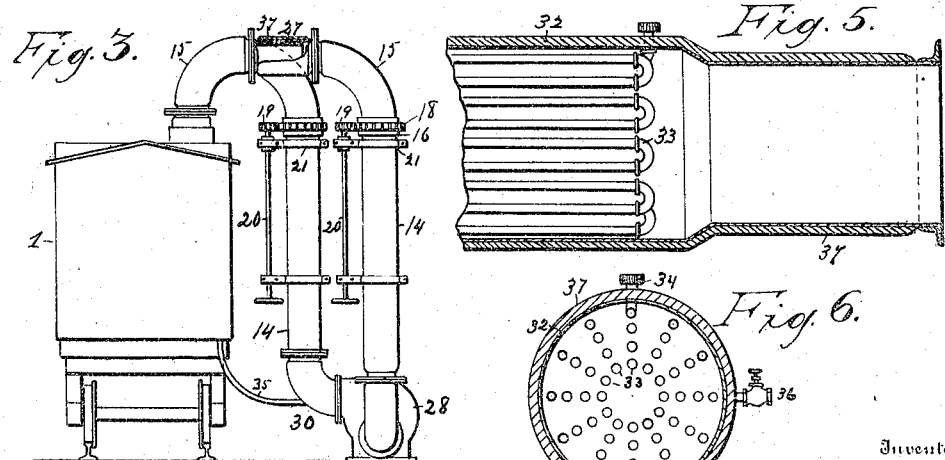

No. 881,832. PATENTED MAR. 10, 1908.
A. R. SPRAGUE.
APPARATUS FOR REFRIGERATION.
APPLICATION FILED AUG. 12, 1905.
2 SHEETS—SHEET 2.
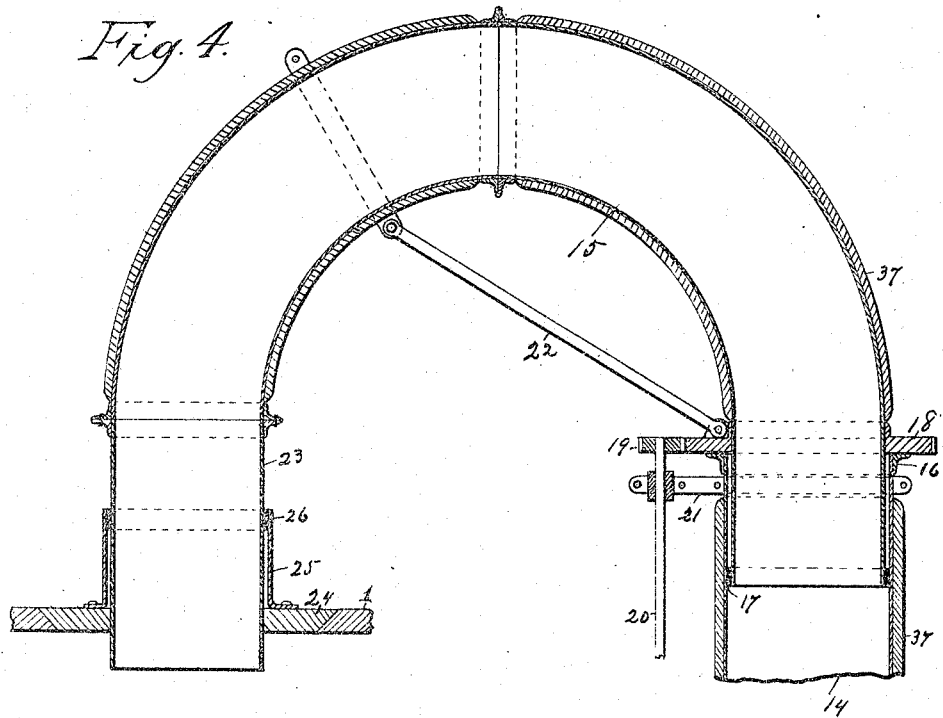
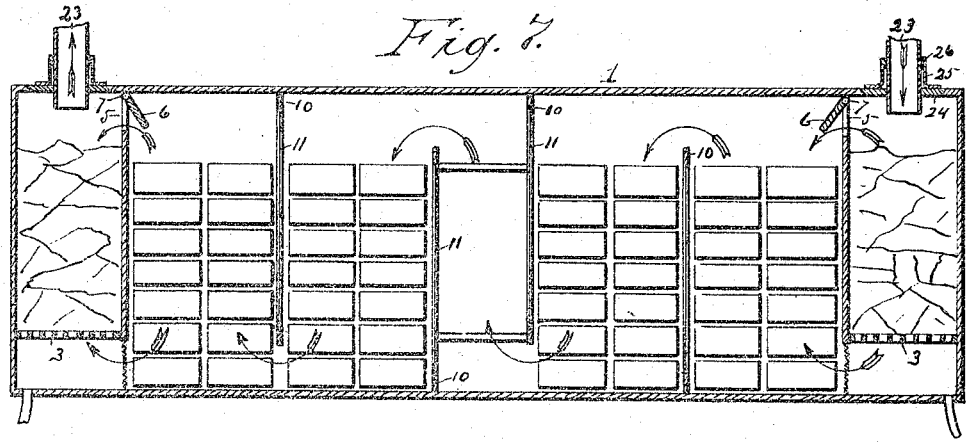

UNITED STATES PATENT OFFICE.

ALMERIN R. SPRAGUE, OF SACRAMENTO, CALIFORNIA, ASSIGNOR, BY MESNE ASSIGNMENTS, TO L. A. ROY, OF CHICAGO, ILLINOIS.

APPARATUS FOR REFRIGERATION.

No. 881,832.   Specification of Letters Patent.   Patented March 10, 1908.

Application filed August 12, 1905. Serial No. 273,931.

*To all whom it may concern:*

Be it known that I, ALMERIN R. SPRAGUE, citizen of the United States, residing at Sacramento, in the county of Sacramento and State of California, have invented certain new and useful Improvements in Apparatus for Refrigeration, of which the following is a specification.

In shipping perishable products, as fruits, vegetables, etc., long distances, as across the continent, it has been discovered that if such products be thoroughly cooled before starting upon the journey the loss from decay during transit will be reduced to a minimum. Heretofore it has been the practice in shipping fruit from California to the Eastern markets to pack the fruit in boxes and put it into cars as quickly as possible and start it upon its journey with as little delay as possible depending upon the circulation of cooled air within the car to effect the thorough cooling of the fruit during its journey. But it has been found impossible to so thoroughly cool the fruit under these conditions as to prevent its decay and especially when the fruit passed through regions of country of extremely high temperatures and the fruit was also subjected to the rise in temperature within the car caused by the decay of some of the more perishable portions of the load.

The object of my invention is to avoid these objections by thoroughly and quickly cooling the fruit or other products before starting it upon its journey and preferably after it had been loaded into the car. A most efficient and economical means for accomplishing this purpose is by passing a continuous current of cold air through the car from one end to the other and also through a cooling medium, preferably ice at one or both ends, and thoroughly circulating and distributing the current to all parts of the car during its passage.

I accomplish this and other objects by means of a mechanism and apparatus shown in the accompanying drawings and hereinafter more fully set forth.

Figure 1 is a vertical longitudinal section of a car, together with a side elevation of one form of apparatus embodying my invention for producing the refrigeration; Fig. 2 is a top plan view of the same; Fig. 3, is an end view; Fig. 4, is a broken sectional view enlarged, of a portion of the top of a car and of the apparatus; Fig. 5, is a broken longitudinal sectional view of a portion of the cooling apparatus; Fig. 6 is a transverse view of the same; Fig. 7, is a longitudinal vertical sectional view of a car body showing another means for producing the circulation of air within the car.

In the drawings 1 indicates the body of a car which may be of any ordinary construction and provided with the usual ice tanks 2 at the ends. The bottoms 3 of the tanks are arranged at a slight distance above the floor of the car and an opening 4 is formed into the interior of the car which is preferably covered with wire screen in the usual manner. An opening 5 is also formed at the upper portion of said wall at or near the roof of the car. A movable damper or regulator 6 is provided for the opening 5 which may be in the form of a wing or shutter that is adapted to be moved as upon pivots 7 to close the opening to a greater or less extent.

In the construction shown in Fig. 1, a baffle board or obstruction 8 is arranged transversely of the car at the top, perferably near the center, with its lower end extending down to a greater or less distance between the boxes or packages of fruit 9, which are arranged in tiers within the car; generally with a wider space at the center of the car than at any other place.

In the arrangement shown in Fig. 7, the baffle boards or obstructions are arranged transversely of the car at different points of its length, each baffle extending from the top or bottom of the car as the case may be and having its opposite edge terminating at such a distance from the opposite portion of the car as to cause a thorough circulation of the air therethrough. The baffles are arranged so as to alternate; that is, each alternate baffle extends from the bottom of the car nearly to the top and the remaining baffles extend downward from the roof of the car nearly to the bottom. But with either arrangement of baffles a current of air is caused to enter the top of the car at one end and have the major portion forced down through the ice in the tank at that end and out through the opening at the bottom where it is distributed and caused to pass among the boxes and through to the opposite end of the car and out through the ice in the tank at that end. The minor portion of the air enters the car through the opening at the top of the ice tank, depending upon the size of the opening as regulated by the dampers at that point, and commingles with the air from the bottom opening. In passing from the interior of the car a greater portion of it passes out through the larger opening at the bottom while a lesser portion passes out through the graduated opening at the top of the ice tank at that end.

In the construction shown in Fig. 1, the baffle prevents the air from passing in a current from one end of the car to the other in the space between the tops of the tiers of boxes and the top of the car and causes it to be thoroughly broken up and evenly distributed throughout the car. In the arrangement of packages shown in Fig. 7, the passage of the air through the car is more in the nature of a serpentine current passing alternately from the bottom to the roof of the car until it finally passes out through the rear ice tank as in the structure shown in Fig. 1, whereby it is thoroughly and uniformly distributed throughout the car.

The baffles are preferably formed from frames 10 upon which sheets of canvas or paper 11 are secured which enables them to be constructed so cheaply that they may be destroyed at the end of their journey without serious loss. It also permits of their being easily placed and secured in position between the different tiers of boxes while the car is being loaded.

It is very desirable that the least possible ripening intervene between the time the fruit leaves the tree and the time it is placed upon the market so as to permit of its being ripened as much as possible on the tree with the least chance of its decaying during transit. For this reason the car and its contents should be cooled as quickly as possible and at the same time economically. I have found a very efficient means for this purpose to consist of an elongated chamber, preferably in the form of a tube 12, arranged lengthwise at one side of the track upon which the car stands while being cooled. The tube is preferably formed in sections for convenience in handling, with the ends of the sections flanged so as to be secured together, as by bolts. A connector or conduit extends from each end of the tube in position to be detachably connected with the car at its top as through the openings 13 into the ice tanks. I prefer to construct these conduits as standpipes 14, the upper end of which overhangs the main portion and is adapted to be moved over the top of the car and away again as by means of a curved portion 15, one end of which extends into the upper end of the pipe and is adapted to be rotatably supported therein, as by means of a band or collar 16. The inner end of said portion is provided with a packing, as a leather filling piece 17, to make an air tight joint. An annular gear wheel 18 is rigidly secured to the portion 15 so as to rest upon the band and rotate the curved portion when the wheel is turned as by a pinion 19 at the upper end of a crank shaft 20 which is journaled in bearings in two clamps 21 secured to the main portion of the stand pipe. If desired a brace 22 may extend from the upper surface of the wheel diagonally upward to engage with the curved portion near its free end and support it. Detachably connected with the free end of the curved portion, which is preferably flanged, is an extension 23 which is adapted to pass loosely through a removable cover 24 in one of the openings 13, the sides of the cover being inclined to fit the opening and the upper end of the extension being flanged to correspond with the flange on the curved portion. An elongated socket, as a piece of tubing 25, is secured to the top of the cover 24 around the opening therein and forms a telescopic joint with the extension by means of which the cover may be adjusted to adapt it for use with cars of different heights. A packing 26, as of leather, is secured to the interior of the upper end of the socket to engage with the extension and form an air tight joint.

Means may be provided for adjusting the position of the ends of the curved portions 15 for adapting them for use with cars of different lengths. This is preferably done by providing one of them with a straight telescopic joint 27, by means of which its radial length can be varied and the end moved to one side or the other of a plane through the stand pipe at right angles to the side of the car. By making the joint rotatable as well as telescopic the extension upon that curved portion can be inserted into and removed from the openings 13 at that end of the car without removing it from said portion.

One of the stand pipes is preferably connected with the end of the tube 12 by means of a casing 28 within which is mounted an ordinary fan or blower which is adapted to create a continuous current through the tube and stand pipes and through the car. One end of the tube is curved as at 29 so as to be joined to the inlet at the center of the casing and the lower end of the stand pipe is curved as at 30 and joined to the outlet of the casing. In this manner that pipe normally stands nearer the car than the other one as shown more particularly in Fig. 3, and permits of the curve at the upper end of said other pipe being provided with the telescopic joint. It also causes the fan shaft 31 to stand lengthwise of the tube whereby the power for rotating the shaft, not shown, can be placed to one side of the tube.

One or more sections of the tube as 32 are preferably enlarged as shown more particularly in Fig. 5, and located therein is an elongated coil 33 of horizontally arranged pipes through which the water or brine, as the case may be, from the melted ice is caused to pass from the drip tubes of the ice tanks and thereby materially assist in cooling the air as it is forced through the tube by the fan or blower in the casing 28. The inlet 34 to the coil is preferably provided with a T and detachably connected with the drip pipes from the ice boxes by means of a flexible conduit or hose 35, and the outlet 36 is conveniently located at any suitable point in the section, as in one side. To prevent the absorption of heat from the outside the tube and stand pipes are preferably provided with a suitable covering as 37.

In cooling or refrigerating a car in accordance with my invention, the car, preferably loaded, is drawn to a point adjacent to the apparatus and the curved portions adjusted so as to permit of the insertion of the extensions into the openings of the ice boxes thereby forming an endless conduit of which the car body forms a part. The blower is then put in operation by starting the motor which will cause a strong current of air to be rapidly circulated through the car and the tube. As the air enters the car the major portion of it passes through the tank and is cooled and dried by the ice and from there it is circulated through the car and passes out at the other end, the most of it going through the tank where the heat and moisture that it had accumulated from the contents of the car are absorbed by the ice in the tank. The lesser portion of the air current passes into the car through the graduated opening at the top of the first tank and commingles with the current of air within the car body which is being deflected and driven to every part of the car by the baffles, and on leaving the car a smaller portion of the air passes through the graduated opening at the upper end of the tank at that end. After leaving the car the air passes down through one stand pipe, through the tube, and up through the other stand pipe back into the car again, and on its way through the tube it is broken up and caused to pass in contact with the different pipes of the coil where it is further cooled by the melted ice and salt, the temperature of the water rising from a trifle above 30 where it leaves the car to about 50 where it leaves the coil. The tube and stand pipes are of such a large size that the air can pass through them in a large volume thereby causing the process of cooling to proceed with great rapidity which is very essential in order to get the car cooled and started on its journey with as little delay as possible. After the car has been thoroughly cooled in this manner, which experience has shown requires to be about 40 to 50 degrees, the ice tanks are replenished with fresh ice, the car closed as tightly as possible and sent forward. Actual experience has shown that when fruit is treated in this manner it has arrived in the Eastern markets in first class condition, or much better than similar fruit that was shipped at the same time but only treated in the usual manner.

Although I have shown a construction that has been found to be very efficient and have described it as applied to fruit, it is evident that changes and modifications may be made in the apparatus and the process may be applied to other products than fruit, as for instance, meats, vegetables, etc., and I reserve the right to make all such changes and applications as will come within the scope of my invention.

Having described my invention what I claim as new and desire to secure by Letters Patent is:—

1. In a means for refrigerating cars, a horizontal tube, two pipes rising therefrom, curved extensions of said pipes rotatable horizontally upon them and adapted to be connected to a car at both ends and a fan or blower for causing an air current to pass through said conduit.

2. In a means for refrigerating cars, a conduit which is provided with two stand-pipes, the upper end of each pipe being provided with a rotatably mounted extension, one end of said extension fitting within the stand-pipe and provided with a packing to form an air tight joint and the other end being movable to a position over the car and away again and adapted to be detachably connected therewith, and means for causing a current of air to pass through said conduit.

3. In a means for refrigerating cars, a conduit which is provided with two stand-pipes, the upper end of each pipe being provided with a rotatably mounted curved portion, a band and two lateral projections on the main portion of each pipe, a crank shaft journaled vertically in said projections and provided at its upper end with a pinion, a gear wheel on the pivotal end of each of said curved portions and in engagement with said pinion, means at the free end of said curved portions adapted for being connected with the car, and means for passing a current of air through said conduit.

4. In a means for refrigerating cars, a conduit which is provided with two stand-pipes, the upper end of each pipe being provided with a rotatably mounted upwardly curved portion, an annular gear wheel on the pivoted end of each of said portions, a brace extending diagonally upward from the top of one of said wheels and engaging with the portion at that end near its free end, a crank shaft journaled vertically at the side of each stand-pipe and having a pinion at its upper end for engaging with the gear wheel on that pipe, means adapted for detachaby connecting the free end of each curved portion with the top of the car, and means for passing a current of air through said conduit.

5. In a means for refrigerating cars, a conduit which is provided with two standpipes, the upper end of each pipe being provided with a curved portion rotatably mounted thereon, one of said portions being provided with a rotatable telescopic joint, means for rotating said portions, means for detachably connecting the free ends of the portions with the top of the car, and means for passing a current of air through said conduit.

6. In a means for refrigerating cars, a conduit which is provided with two standpipes, the upper end of each pipe being provided with a rotatably mounted projection, an extension at the free end of the projection adapted to enter an opening at the top of the car, a cover for said opening adjustably connected with said extension, and means for passing a current of air through said conduit.

7. In a means for refrigerating cars, a conduit which is provided with two standpipes, the upper end of each pipe being provided with a rotatably mounted portion, the free end of said portion being flanged, a flanged extension detachably secured to said free end, a cover on said extension provided with a piece of pipe surrounding the extension, packing between the pipe and the extension, and means for passing a current of air through said conduit.

8. In a means for refrigerating cars, a horizontal tube, two standpipes rising therefrom, an extension horizontally turnable upon the upper end of each standpipe a blower casing interposed between one of said standpipes and the tube and communicating with both, and a telescopic joint in the extension of the other standpipe whereby its radial length can be altered; the standpipe with which the blower casing is connected being located to one side of the other portions of the conduit.

9. In a means for refrigerating cars, a casing, a tube connected with the inlet thereof and a stand-pipe connected with the outlet, a stand-pipe connected with the other end of the tube, a blower in the casing, and a coil within the tube, the inlet of which is adapted to be detachably connected with the drip pipes of a refrigerator car.

10. In a means for refrigerating cars, a casing, a tube, one end of which is curved upward and connected with the inlet of the casing at the center, a stand-pipe having its lower end curved and connected with the outlet of the casing, a stand-pipe connected with the other end of the tube, the upper end of each pipe being adapted to be detachably connected to the top of a car, a blower in the casing with its shaft in line with the length of the tube, and a coil in said tube, the inlet end of which is adapted to be detachably connected with the drip pipes of a refrigerator car.

11. In a means for refrigerating cars, a tube, exteriorly of and separate from the car, an elongated coil arranged therein, means for connecting one end of said coil with the opposite ends of a car at the bottom, means for detachably connecting the ends of the tube with the top of the car, and means for forcing a continuous current of air through the tube and the car.

12. In a means for refrigerating cars, a tube formed in sections, a portion of which are of a larger diameter than the others, an elongated coil in said larger portion consisting of a series of connected horizontally arranged pipes, means for detachably connecting the inlet of the coil with the drip pipes of a refrigerator car, stand pipes for detachably connecting the ends of the tube with a car, and a blower at one end of the tube to pass a current of air therethrough and through the stand-pipes and through the car.

13. In a means for refrigerating cars, a tube, an elongated coil therein, a T connected with the inlet of said coil, a pipe extending from each end of the T and adapted to be detachably connected with a car, a conduit from each end of the tube provided with means for being detachably connected with the top of the car, and means for producing a continuous current of air through the tube and through the car.

In testimony whereof I affix my signature, in presence of two witnesses, this 3rd day of August 1905.

ALMERIN R. SPRAGUE.

Witnesses:
W. S. BOYD,
M. R. SEELY.